(12) United States Patent
Fullenkamp et al.

(10) Patent No.: US 6,533,230 B2
(45) Date of Patent: Mar. 18, 2003

(54) ONE-PIECE MOUNTING BRACKET AND VEHICLE DAMPER ASSEMBLY AND MOUNTING METHOD

(75) Inventors: Patrick H. Fullenkamp, Bellbrook, OH (US); Sebastian Kaffanke, Bytom (PL); Piotr A. Kos, Miamisburg, OH (US); Robert J. Wittman, Jr., Kettering, OH (US); Chad M. Ehresman, Fairborn, OH (US); James R. Waag, Miamisburg, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/015,112

(22) Filed: Dec. 12, 2001

(65) Prior Publication Data
US 2002/0125382 A1 Sep. 12, 2002

Related U.S. Application Data

(60) Provisional application No. 60/274,411, filed on Mar. 9, 2001.

(51) Int. Cl.⁷ .................................................. A47F 5/00
(52) U.S. Cl. ........................................ 248/300; 248/631
(58) Field of Search ................................ 248/300, 200, 248/230.1, 218.4, 631, 560, 75, 230.2, 278.2, 279.11; 280/124.154, 124.155

(56) References Cited

U.S. PATENT DOCUMENTS 5,201,389 A * 4/1993 Miller et al. ................ 188/299
5,669,728 A * 9/1997 Koba ....................... 248/230.1
5,772,168 A * 6/1998 Nakazawa et al. .......... 248/300
6,367,751 B1 * 4/2002 Perrott ..................... 248/230.1

FOREIGN PATENT DOCUMENTS

GB         2187532 A  *  9/1987

* cited by examiner

Primary Examiner—Ramon O. Ramirez
(74) Attorney, Agent, or Firm—Scott A. McBain

(57) ABSTRACT

The invention provides a one-piece mounting bracket for mounting a vehicle damper assembly to a knuckle, a vehicle damper assembly, and a method for mounting a vehicle damper assembly to a knuckle. The one-piece mounting bracket includes a body having first and second opposing portions; the body portions include at least one opening formed therein. The bracket further includes a plurality of straps operably attached adjacent end portions of the first and second body portions. The bracket is adapted for operable attachment to a portion of the vehicle damper assembly with a plurality of proximate welds. The vehicle damper assembly includes a damper including a reservoir tube, and a one-piece mounting bracket operably attached to the reservoir tube with a plurality of proximate welds. The mounting method includes providing a one-piece mounting bracket, attaching the bracket to a portion of the vehicle damper assembly by a proximate welding process, and attaching the bracket to the knuckle.

16 Claims, 4 Drawing Sheets

ONE-PIECE MOUNTING BRACKET AND VEHICLE DAMPER ASSEMBLY AND MOUNTING METHOD

This application claims the benenfit of provisional application No. 60/274,411, field Mar. 9, 2001.

TECHNICAL FIELD OF THE INVENTION

The present invention relates generally to vehicular suspension systems. More particularly, the invention relates to mounting a vehicle damper assembly to a knuckle with an improved one-piece mounting bracket.

BACKGROUND OF THE INVENTION

Conventional vehicle suspension systems may include dampers such as shocks and struts mounted between the wheel assembly and chassis. A bracket may be used to connect a lower portion of the damper with a knuckle portion of the wheel assembly. Several considerations may be made in the design of these brackets to provide a lightweight, reliable, and cost-effective strategy for attaching the vehicle dampers.

One consideration in bracket design relates to the number of integral components comprising the bracket. A bracket may be formed by pressing one or more flat metal pieces into its final form. Generally, a bracket having a single piece has less mass than one having multiple pieces. In addition, a one-piece bracket may be less expensive and may be produced at a higher volume due to its lower part number. Accordingly, it would be desirable for a bracket to be formed from as few integral components as possible.

Another consideration in bracket design relates to damper attachment. A bracket may be attached to the damper with a variety of welds. For example, several bracket designs utilize one or more (semi-) circular welds. Other bracket designs utilize a plurality of linear welds spaced at a distance. Such welding methodologies typically involve rotating the damper to perform the weld thereby complicating the process. Reducing the need for compound welding operations may decrease production cost and increase productivity. As such, it would be desirable for a bracket to be attached to a damper with a simplified welding process.

Another consideration in bracket design relates to damper attachment redundancy. To provide a redundant mechanical attachment feature, a bracket may include one or more portions that wrap-around the damper. The wrap-around portions may prevent the bracket attachment from failing in case of bad welds or excessive stress. Some brackets do not have wrap-around portions and, therefore, attachment redundancy. Accordingly, it would be desirable for a bracket to include damper attachment redundancy.

Therefore, it would be desirable to provide a one-piece mounting bracket, and a strut damper assembly and mounting method having such a bracket, that overcomes the aforementioned and other disadvantages.

SUMMARY OF THE INVENTION

One aspect of the present invention provides a one-piece mounting bracket for mounting a vehicle damper assembly to a knuckle. The bracket includes a body having first and second opposing portions; the body portions include at least one opening formed therein. The bracket further includes a plurality of straps operably attached adjacent end portions of the first and second body portions. The bracket is adapted for operable attachment to a portion of the vehicle damper assembly with a plurality of proximate welds. At least one reinforcing member may be operably attached to the straps. At least one strap opening may be formed between the straps. The straps may be adapted to receive a portion of the vehicle damper assembly. The body portion openings may be aligned for receiving at least one knuckle attachment member. The bracket may be formed from a single unitary member.

Another aspect of the invention provides a vehicle damper assembly. The vehicle damper assembly includes a damper including a reservoir tube, and a one-piece mounting bracket operably attached to the reservoir tube with a plurality of proximate welds. The bracket includes a body having first and second opposing portions; the body portions include at least one opening formed therein. The bracket further includes a plurality of straps operably attached adjacent end portions of the first and second body portions. At least one reinforcing member may be operably attached to at least one of the straps. At least one strap opening may be formed between the straps. The straps may be adapted to receive the reservoir tube. The body portion openings may be aligned for receiving at least one knuckle attachment member. The bracket may be formed from a single unitary member. The assembly may further include a stabilizer bracket adapted to receive a stabilizer bar. The one-piece mounting bracket and stabilizer bracket may be welded to the reservoir tube contemporaneously.

Another aspect of the invention provides a method for mounting a vehicle damper assembly to a knuckle. The mounting method includes providing a one-piece mounting bracket, attaching the bracket to a portion of the vehicle damper assembly by a proximate welding process, and attaching the bracket to the knuckle. The bracket includes a body having first and second opposing portions; the body portions including at least one opening formed therein. The bracket further includes a plurality of straps operably attached adjacent end portions of the first and second body portions. At least one reinforcing member may be operably attached to at least one of the straps. The bracket may be formed from a single unitary member. The proximate welding process may include applying a plurality of proximate welds in a maintained flat position. Attaching the bracket to the knuckle may include aligning the body portion openings with the knuckle and inserting at least one knuckle attachment member through the aligned openings. The method may further include contemporaneously welding the one-piece mounting bracket and a stabilizer bracket to the damper assembly.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

DETAILED DESCRIPTION OF THE PRESENTLY PREFERRED EMBODIMENTS

Figure 1:
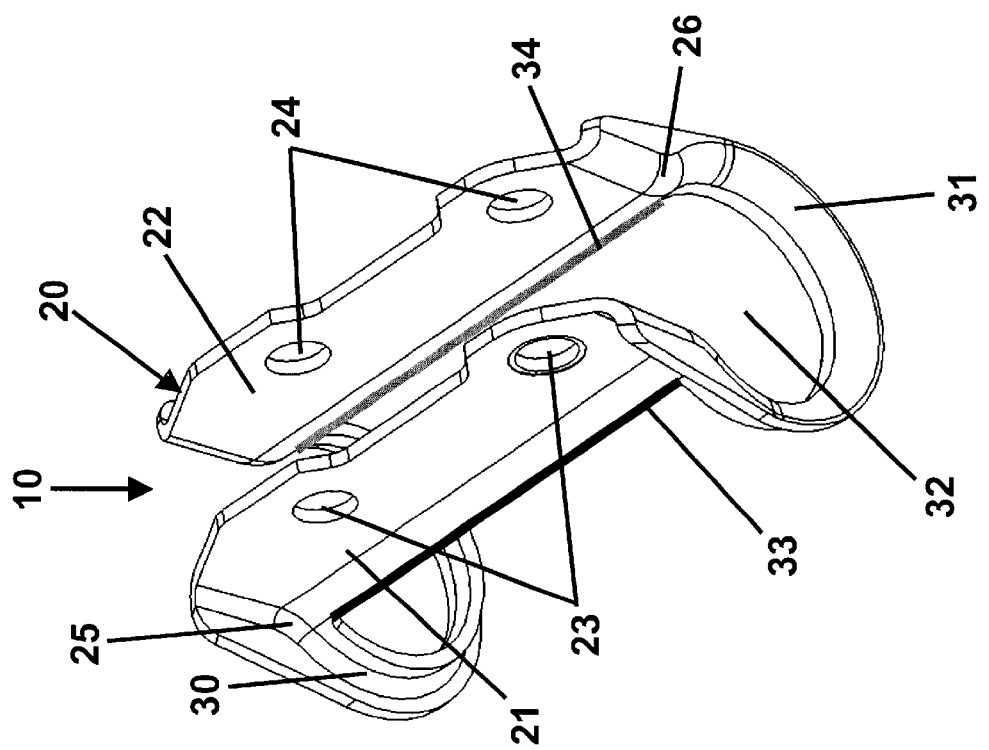
FIG. 1 is a perspective view of a one-piece mounting bracket made in accordance with the present invention.

Referring to the drawings, wherein like reference numerals refer to like elements, FIG. 1 is a perspective view of a one-piece mounting bracket made in accordance with the present invention and shown generally by numeral 10. Bracket 10 may provide a lightweight, reliable, and cost-effective means for mounting a vehicle damper assembly to a wheel assembly knuckle.

Bracket 10 includes a body 20 having a first body portion 21 opposed to a second body portion 22. First and second body portions 21, 22 each have at least one opening formed therein. In one embodiment, first body portion 21 may have two openings 23 concentrically aligned with two openings 24 formed in second body portion 22. Openings 23, 24 may be adapted to receive a knuckle attachment member (e.g., a bolt) used to attach the bracket to the wheel assembly knuckle. Those skilled in the art will recognize that body portion opening(s) 23, 24 size, number, and position may vary to facilitate bracket 10 attachment to the knuckle.

Bracket 10 further includes a plurality of straps operably attached adjacent end portions 25, 26 of first and second body portions 21, 22. In one embodiment, a first strap 30 and a second strap 31 are provided. In another embodiment, three or more straps may be provided. Straps 30, 31 may provide means for joining first body portion 21 to second body portion 22. Straps 30, 31 may be adapted to receive a portion of a damper assembly. Preferably, straps 30, 31 are shaped to provide continuous surface contact with the damper assembly. In one embodiment, straps 30, 31 may form a rounded shape contoured to receive a cylindrical portion of the damper assembly. The rounded straps 30, 31 may provide a redundant mechanical feature to further secure bracket 10 to the damper assembly.

At least one strap opening may be formed between straps 30, 31. In one embodiment, a strap opening 32 may be formed between straps 30, 31. In another embodiment, two or more openings may be formed between straps 30, 31. Strap opening 32 may provide means for reducing the overall mass of bracket 10 without substantially reducing its effectiveness. For example, the illustrated bracket 10 may exhibit about a 50 percent reduction in mass while providing a comparable or lower failure rate (i.e., bracket separating from the damper assembly) to some current two-piece mounting bracket designs.

Bracket 10 may be adapted for operable attachment to a portion of the damper assembly with a plurality of proximate welds. In one embodiment, first and second body portions 21, 22 may form substantially flat members projecting axially from the damper assembly positioned within straps 30, 31. Bracket 10 may be adapted to receive proximate linear welds 33, 34 (weld 34 shown in phantom) on body portions 21, 22 to attach to the damper assembly. Of note, proximate welds 33, 34 need not be linear. Body portions 21, 22 may be positioned proximate to one another to permit bracket 10 to be welded to the damper assembly without having to rotate or change the position of the damper assembly with respect to the welding apparatus. As such, this welding strategy may provide a simplified process thereby decreasing production time and cost.

Bracket 10 may be manufactured from a sufficiently rigid material such as metal (e.g., low carbon steel), metal alloy, or the like. Bracket 10 may be formed from a single unitary member. In one embodiment, bracket 10 may be formed by stamping a single sheet of material into final form. Forming the bracket 10 from a single unitary member of material may reduce unit mass as well as production time and cost. Openings 23, 24 and strap opening 32 may be formed at any point of bracket 10 manufacture. In one embodiment, openings 23, 24 and/or strap opening 32 may be formed before the single sheet of material is stamped. In another embodiment, openings 23, 24 and/or strap opening 32 may be formed after bracket 10 has taken final form.

Figure 2:
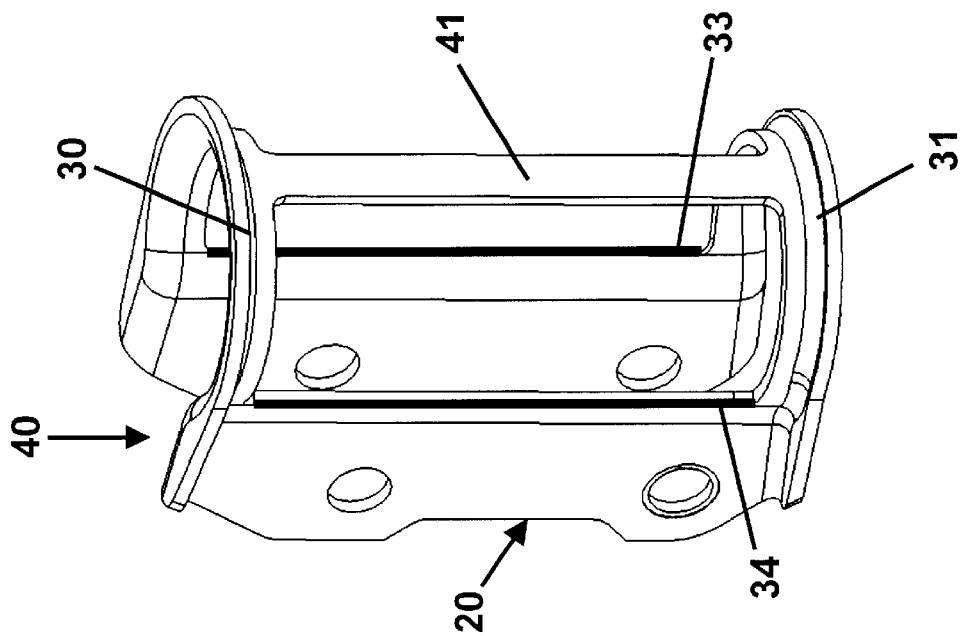
FIG. 2 is a perspective view of another one-piece mounting bracket made in accordance with the present invention.

FIG. 2 is a perspective view of another one-piece mounting bracket 40 made in accordance with the present invention. Bracket 40 includes the structural elements (e.g., body 20, straps 30, 31, proximate linear welds 33, 34, and portions and openings thereof) and advantages described for bracket 10 shown in FIG. 1. In addition, bracket 40 includes a reinforcing member 41 operably attached to straps 30, 31. Reinforcing member 41 may be operably attached (e.g., welded) to bracket 40 or formed as part of the single unitary member. Reinforcing member 41 may provide several advantages. For example, reinforcing member 41 may improve structural integrity to straps 30, 31 without significantly increasing bracket 40 mass. Furthermore, reinforcing member 41 may provide an additional redundant mechanical feature for securing bracket 40 to a damper assembly. Those skilled in the art will recognize that the size, number, arrangement, and attachment point(s) of reinforcing member 41 may be varied while still providing any number of related advantages.

Figure 3:
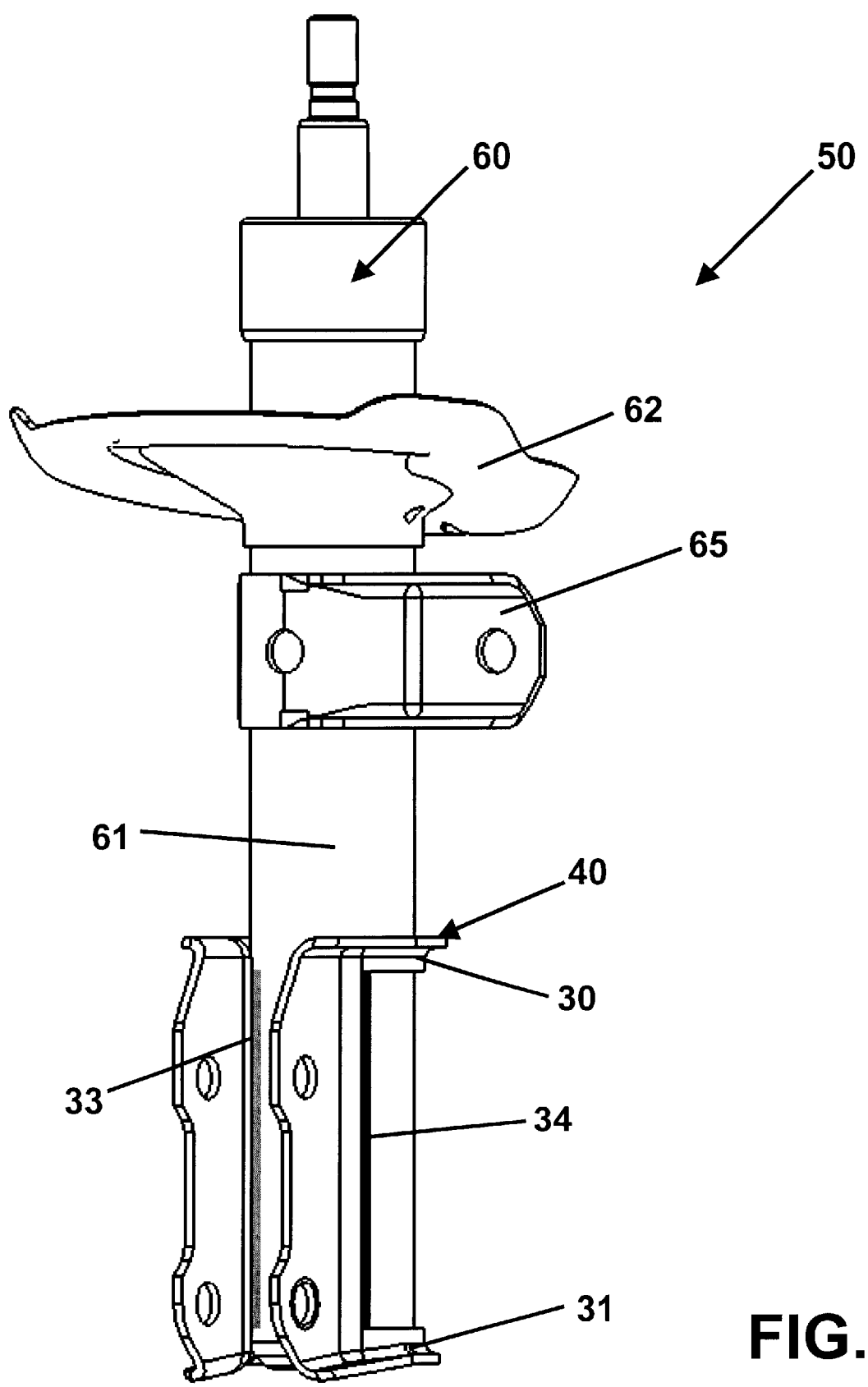
FIG. 3 is a perspective view of a vehicle damper assembly made in accordance with the present invention.
Figure 4:
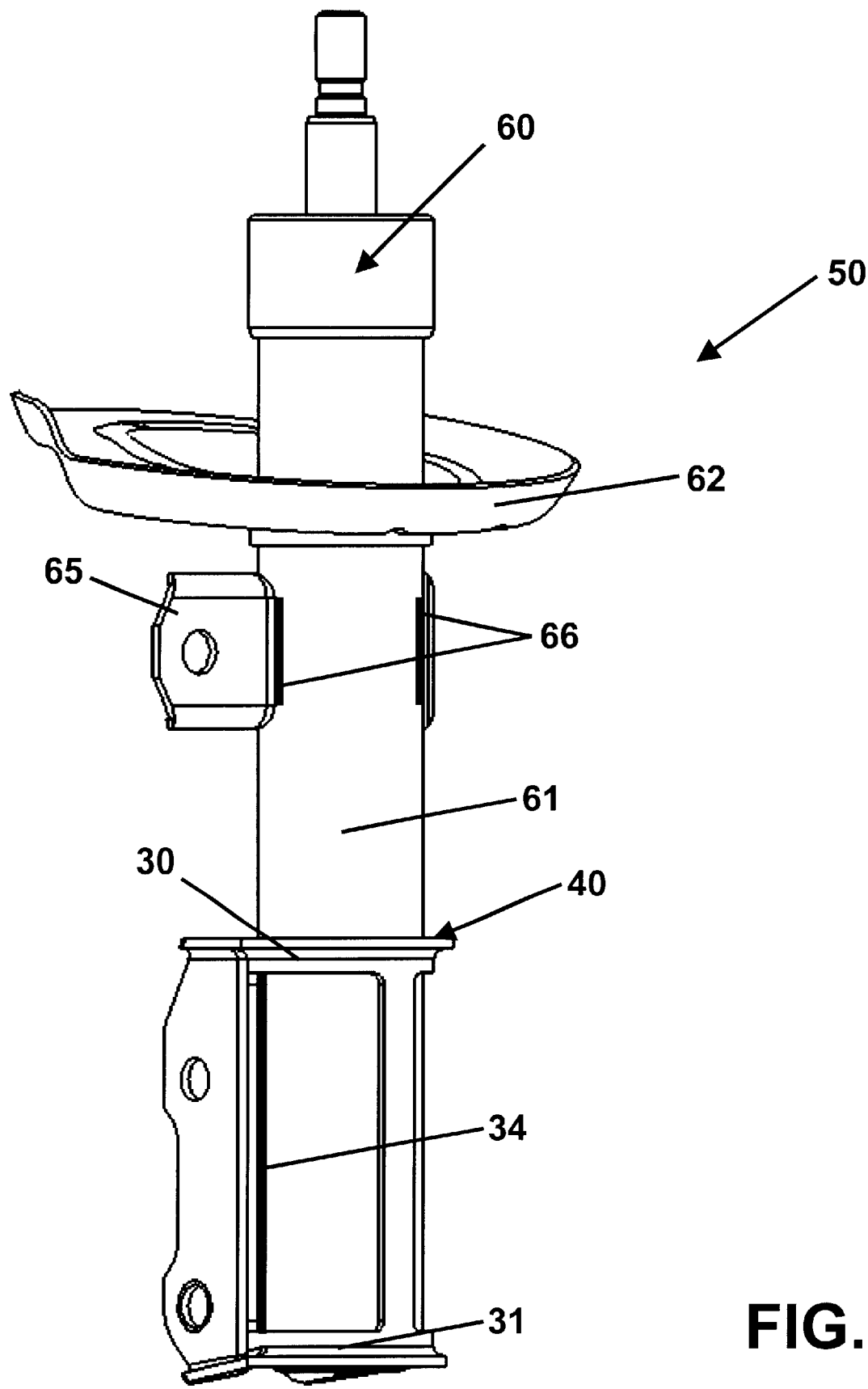
FIG. 4 is an alternate perspective view of the vehicle damper assembly shown in FIG. 3.

FIGS. 3 & 4 are alternative perspective views of a vehicle damper assembly 50 made in accordance with the present invention. Vehicle damper assembly 50 may include a damper 60 including a reservoir tube 61, a lower spring seat 62, and one-piece mounting bracket 40 operably attached to reservoir tube 61 with a plurality of proximate linear welds 33, 34 (weld 33 shown in phantom). Damper 60 may be one of any variety of dampers including shock absorbers, struts, and the like used for dampening vehicle suspension movements; the illustrated damper 60 is a strut. Straps 30, 31 may be adapted to receive an end portion of reservoir tube 61. The assembly 50 may further include a stabilizer bracket 65 adapted to receive a stabilizer bar. One-piece mounting bracket 50 and stabilizer bracket 65 may be welded to reservoir tube 61 contemporaneously. In one embodiment, bracket 50 and stabilizer bracket 65 may be welded to reservoir tube 61 using proximate linear welds 33, 34, and 66 during a single assembly step. This may be achieved without rotating reservoir tube 61 between welds. As such, this welding strategy may provide a simplified process thereby decreasing production time and cost. In another embodiment, the stabilizer bracket 65 may be welded to reservoir tube 61 with one or more arc welds. Those skilled in the art will recognize that a variety of attachment means may be used for effectively attaching bracket 50 and stabilizer bracket 65 to reservoir tube 61.

Figure 5:
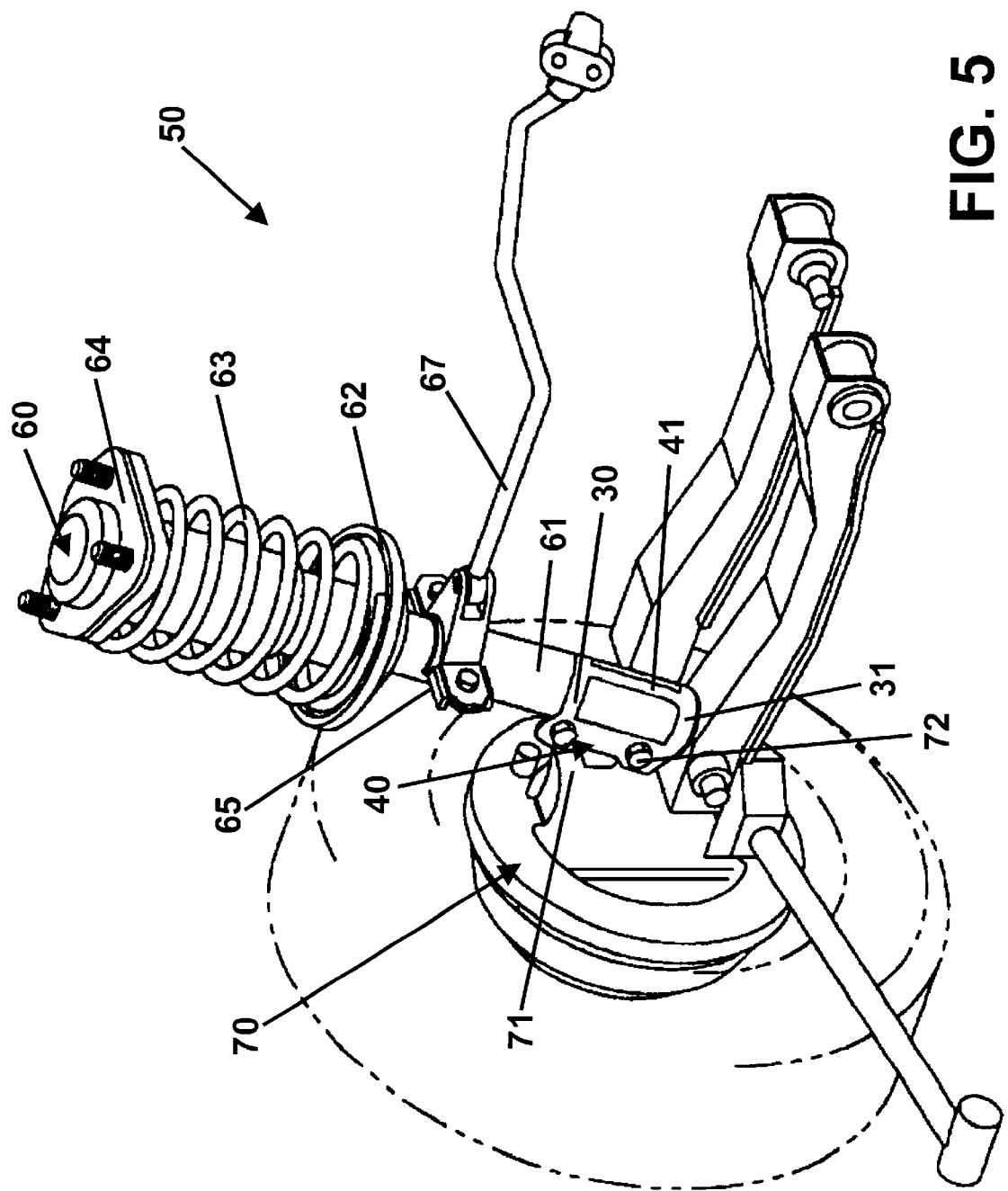
FIG. 5 is a perspective view of a vehicle damper assembly mounted to a knuckle, made in accordance with the present invention.

FIG. 5 is a perspective view of vehicle damper assembly 50 mounted to a knuckle 71, made in accordance with the present invention. Damper assembly 50 includes a spring 63 positioned between an upper spring seat 64 and lower spring seat 62. A stabilizer bar 67 may be attached to stabilizer bracket 65. A lower portion of damper assembly SO may be mounted to a vehicle wheel assembly 70; specifically, bracket 40 may be attached to knuckle 71.

Mounting of damper assembly 50 to the knuckle 71 may begin by positioning bracket 40 and damper 60. A portion of damper reservoir tube 61 may be slidably positioned within bracket straps 30, 31. Reinforcement member 41 may hold straps 30, 31 in proper alignment thereby facilitating reservoir tube 61 positioning. For example, reinforcement member 41 may maintain concentricity of straps 30, 31 thereby allowing reservoir tube 61 to be easily slid into bracket 40.

Bracket 40 may then be attached to reservoir tube 61 by a proximate welding process. In one embodiment, damper assembly 50 may be maintained in a flat position (e.g., horizontally) while two proximate linear welds are applied to bracket 40. As such, molten welding material produced during welding may be kept from running or dripping onto undesired areas. Furthermore, the proximal position of the welds may reduce or eliminate the need to rotate or change the position of damper assembly 50 with respect to a welding apparatus. One-piece mounting bracket 40 and stabilizer bracket 65 may be contemporaneously welded to damper assembly SO during the proximate welding process.

Vehicle damper assembly 50 and attached bracket 40 may then be attached to knuckle 71 by aligning bracket openings with corresponding openings formed in knuckle 71. At least one knuckle attachment member 72 may be positioned through the aligned openings. In one embodiment, two bolts 72 may be inserted through the aligned openings for attaching damper assembly 50 and attached bracket 40 to knuckle 71. Bolts 72 may include a nut (not shown) for fastening means.

While the embodiments of the invention disclosed herein are presently considered to be preferred, various changes and modifications can be made without departing from the spirit and scope of the invention. For example, the bracket and damper assembly configurations, and method of mounting the same are not limited to any particular design or sequence. Specifically, the strap and reinforcement member number and configuration, nature of the damper, and mounting step order may vary without limiting the utility of the invention. Upon reading the specification and reviewing the drawings hereof, it will become immediately obvious to those skilled in the art that myriad other embodiments of the present invention are possible, and that such embodiments are contemplated and fall within the scope of the presently claimed invention. The scope of the invention is indicated in the appended claims, and all changes that come within the meaning and range of equivalents are intended to be embraced therein.

What is claimed is:

1. A one-piece mounting bracket for mounting a vehicle damper assembly to a knuckle, the bracket comprising:
    a body having first and second opposing portions, the body portions including at least one opening formed therein;
    a plurality of straps operably attached adjacent end portions of the first and second body portions, wherein the bracket is adapted for operable attachment to a portion of the vehicle damper assembly with a plurality of proximate welds; and
    at least one reinforcing member operably attached to the straps.
2. The bracket of claim 1 wherein the bracket is formed from a single unitary member.
3. The bracket of claim 1 wherein at least one strap opening is formed between the straps.
4. The bracket of claim 1 wherein the straps are adapted to receive a portion of the vehicle damper assembly.
5. The bracket of claim 1 wherein the body portion openings are aligned for receiving at least one knuckle attachment member.
6. A vehicle damper assembly comprising:
    a damper including a reservoir tube;
    a one-piece mounting bracket operably attached to the reservoir tube with a plurality of proximate welds, the bracket including a body having first and second opposing portions, the body portions including at least one opening formed therein, and a plurality of straps operably attached adjacent end portions of the first and second body portions; and
    at least one reinforcing member operably attached to at least one of the straps.
7. The assembly of claim 6 wherein the bracket is formed from a single unitary member.
8. The assembly of claim 6 further comprising a stabilizer bracket adapted to receive a stabilizer bar, wherein the one-piece mounting bracket and stabilizer bracket are welded to the reservoir tube contemporaneously.
9. The assembly of claim 6 wherein at least one strap opening is formed between the straps.
10. The assembly of claim 6 wherein the straps are adapted to receive the reservoir tube.
11. The assembly of claim 6 herein the body portion openings are aligned for receiving at least one knuckle attachment member.
12. A method for mounting a vehicle damper assembly to a knuckle, the method comprising:
    providing a one-piece mounting bracket, the bracket comprising a body having first and second opposing portions, the body portions including at least one opening formed therein, a plurality of straps operably attached adjacent end portions of the first and second body portions, and at least one reinforcing member operably attached to at least one of the straps;
    attaching the bracket to a portion of the vehicle damper assembly by a proximate welding process; and
    attaching the bracket to the knuckle.
13. The method of claim 12 wherein the bracket is formed from a single unitary member.
14. The method of claim 12 wherein the proximate welding process comprises applying a plurality of proximate welds in a maintained flat position.
15. The method of claim 12 wherein attaching the bracket to the knuckle comprises:
    aligning the body portion openings with the knuckle; and
    inserting at least one knuckle attachment member through the aligned openings.
16. The method of claim 12 further comprising contemporaneously welding the one-piece mounting bracket and a stabilizer bracket to the damper assembly.

* * * * *